US010227136B1

(12) United States Patent
Waggener, Jr. et al.

(10) Patent No.: US 10,227,136 B1
(45) Date of Patent: Mar. 12, 2019

(54) MULTIPLE INPUT RELEASE MECHANISM FOR DEPLOYABLE EMERGENCY LOCATOR TRANSMITTER AND FLIGHT RECORDER

(71) Applicant: L3 Technologies, Inc., New York, NY (US)

(72) Inventors: William N. Waggener, Jr., Sarasota, FL (US); Michael E. Weed, Nokomis, FL (US)

(73) Assignee: L3 TECHNOLOGIES, INC., New York, NY (US)

( * ) Notice: Subject to any disclaimer, the term of this patent is extended or adjusted under 35 U.S.C. 154(b) by 0 days.

(21) Appl. No.: 15/794,972

(22) Filed: Oct. 26, 2017

(51) Int. Cl.
*B64D 25/20* (2006.01)
*G07C 5/08* (2006.01)
*B64D 45/00* (2006.01)

(52) U.S. Cl.
CPC ............ *B64D 25/20* (2013.01); *G07C 5/0841* (2013.01); *B64D 2045/0065* (2013.01)

(58) Field of Classification Search
CPC ............ B64D 25/20; B64D 2045/0065; G07C 5/0841
See application file for complete search history.

(56) References Cited

U.S. PATENT DOCUMENTS

| 2017/0247118 A1* | 8/2017 | Adler | ................... B64D 45/00 |
| 2017/0248701 A1* | 8/2017 | Adler | ................... G01S 19/17 |

* cited by examiner

*Primary Examiner* — Leon Flores
(74) *Attorney, Agent, or Firm* — Dickinson Wright PLLC

(57) ABSTRACT

Various systems may benefit from appropriate triggers to action. For example, various deployable safety devices, such as emergency locator transmitters and flight recorders, may benefit from a multiple input release mechanism. A method can include identifying the presence of at least one crash indicator. The method can also include performing an analysis of aircraft distress based on aircraft parameters other than the at least one crash indicator to provide an analysis result of aircraft distress. The method can further include triggering the release of a safety device contingent upon the presence of the at least one crash indicator being accompanied by a positive result of aircraft distress.

18 Claims, 3 Drawing Sheets

MULTIPLE INPUT RELEASE MECHANISM FOR DEPLOYABLE EMERGENCY LOCATOR TRANSMITTER AND FLIGHT RECORDER

BACKGROUND

Field

Various systems may benefit from appropriate triggers to action. For example, various deployable safety devices, such as emergency locator transmitters and flight recorders, may benefit from a multiple input release mechanism.

Description of the Related Art

Fixed and rotary wing aircraft have for many years had the capability to deploy a buoyant package containing an Emergency Locater Transmitter (ELT), sometimes referred to as a Crash Position Indicator (CPI). The intent of this deployment is so that if the aircraft crashes, the transmitter will guide Search and Rescue (SAR) teams to the crash site. Modern implementations also contain memory, as a flight recorder does, that holds flight data that can help accident investigators determine the cause of the accident. These are called an Automatic Deployable Flight Recorder (ADFR). Historically, there have been a relatively large number of inadvertent deployments, which means that the CPI or the ADFR has been ejected from the aircraft incorrectly, namely when there is no emergency or crash.

The decision to eject a CPI or an ADFR can be made by multiple differing sensor types, for example: (1) contiguous electrical wires, usually redundant, that when broken indicate that the fuselage and/or the wings have buckled or broken; (2) hydrostatic sensors that detect submersion in water, sometimes tuned for saline water deployment only. Other types of triggering sensors detect, for example, g-forces. The sources of inadvertent deployments are varied, and can range from sensor failure, to accidental manual activation, wiring corrosion, or the like.

SUMMARY

According to certain embodiments of the present invention, a method can include identifying the presence of at least one crash indicator. The method can also include performing an analysis of aircraft distress based on aircraft parameters other than the at least one crash indicator to provide an analysis result of aircraft distress. The method can further include triggering the release of a safety device contingent upon the presence of the at least one crash indicator being accompanied by a positive result of aircraft distress.

In certain embodiments of the present invention, an apparatus can include at least one processor and at least one memory including computer program code. The at least one memory and the computer program code can be configured to, with the at least one processor, cause the apparatus at least to identify the presence of at least one crash indicator. The at least one memory and the computer program code can also be configured to, with the at least one processor, cause the apparatus at least to perform an analysis of aircraft distress based on aircraft parameters other than the at least one crash indicator to provide an analysis result of aircraft distress. The at least one memory and the computer program code can further be configured to, with the at least one processor, cause the apparatus to trigger the release of a safety device contingent upon the presence of the at least one crash indicator being accompanied by a positive result of aircraft distress.

A non-transitory computer-readable medium can, according to certain embodiments of the present invention, be encoded with instructions that, when executed in hardware, perform a process. The process can include identifying the presence of at least one crash indicator. The process can also include performing an analysis of aircraft distress based on aircraft parameters other than the at least one crash indicator to provide an analysis result of aircraft distress. The process can further include triggering the release of a safety device contingent upon the presence of the at least one crash indicator being accompanied by a positive result of aircraft distress.

BRIEF DESCRIPTION OF THE DRAWINGS

For proper understanding of the invention, reference should be made to the accompanying drawings, wherein.

DETAILED DESCRIPTION

Various embodiments of the present invention may aim to avoid inadvertent deployment of a CPI, an ADFR or any other system, now or hereafter used, for recording aircraft data for retrieval and assessment in connection with an aircraft crash. Thus, certain embodiments may reduce hazards to ground personnel, airframe damage, and to false alarms that may result in SAR initiation.

There are a number of parameters that can indicate that an aircraft is in distress. These parameters may be used to provide a trigger signal indicative of airplane distress. Some example parameters include the following: (1) bank angle (or roll) >50 degrees, or roll >45 degrees and roll rate >10 degrees/second; (2) excessive vertical speed; (3) excessive aircraft acceleration; (4) ground proximity (or terrain awareness and warning system (TAWS) warning); (5) cabin altitude warning; or (6) other aircraft event data.

These parameters can be examined and analyzed based on historical crash events to determine if the aircraft is in distress and a crash may be imminent.

Certain embodiments of the present invention may reduce the possibility of an inadvertent deployment by inclusion of qualifying inputs to the decision to automatically deploy a CPI or an ADFR. Those skilled in the art understand that embodiments of the present invention for the intelligent deployment of a CPI or an ADFR may additionally or alternatively include the deployment of similar devices, now or hereafter in use. The inputs can be supplied by aircraft parameters, events, or aircraft warnings. These parameters, events and warnings can be combined in an algorithm that can determine if the aircraft is in distress and can generate a signal that indicates aircraft distress. The algorithm may be based on, for example, EUROCAE ED-237, which is a minimum performance specification for in-flight event detection and triggering criteria. However, other flight parameters can be taken into account and flight parameters taken into account by EUROCAE ED-237 may be omitted.

This signal can be logically ANDED with other crash indications, such as frangible linkages, hydrostatic sensors, g-switches or any other desired crash indication, to automatically deploy the CPI or the ADFR. A g-switch can be a device that is triggered by large acceleration forces, also called G forces. Manual deployment, if available, is not necessarily ANDED with the distress trigger logic, but could be. When operating the release control in this manner, multiple mechanisms can agree on release of the CPI or the ADFR, and the possibility of release due to failure of crash indicating components is reduced.

Figure 1:
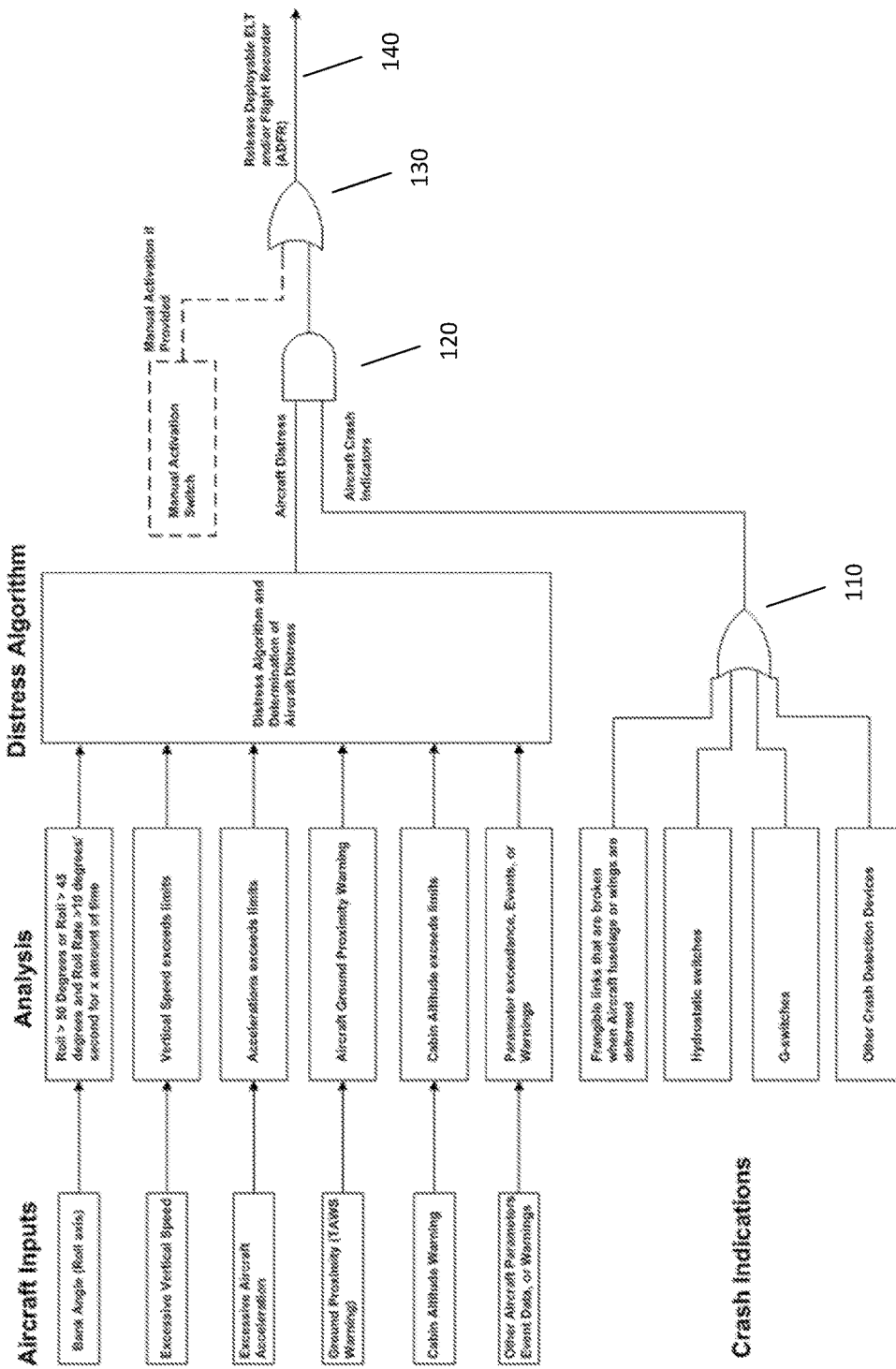
FIG. 1 illustrates an exemplary architecture of a deployable safety device, according to certain embodiments of the present invention.

FIG. 1 illustrates an exemplary architecture of a deployable safety device, according to certain embodiments of the present invention. As shown in FIG. 1, the major inputs can be either aircraft inputs or crash indicators. Each of the aircraft inputs can be subject to analysis and can be taken into account in a distress algorithm. The crash indications can be provided to a logical OR gate 110, such that if any crash indication indicates a crash, the output of the logical OR gate 110 indicates a crash. These aircraft crash indicators can be provided to a logical AND gate 120 where they can be combined with an aircraft distress output of the distress algorithm.

An optional manual activation switch can be manually activated if desired. The output of this manual activation switch can be provided to a logical OR gate 130 in combination with the output of logical AND gate 120. Output signal 140 can indicate an instruction to release a deployable ELT and/or flight recorder, if either there is a manual activation or there is a crash indicator and the aircraft appears to be in distress.

As mentioned above, each of the aircraft inputs can be subject to analysis. For example, bank angle or roll axis can be subject to a threshold or a set of thresholds. For example, the distress algorithm may take into account whether the current bank angle is greater than 50 degrees or greater than 45 degrees with a roll rate of more than 10 degrees per second for a certain amount of time.

The aircraft input regarding excessive vertical speed can be analyzed to take into account whether the vertical speed of the aircraft exceeds some threshold limit. Similarly, the aircraft input regarding excessive aircraft acceleration can be analyzed to take into account whether the aircraft acceleration exceeds a defined limit.

Ground proximity warnings and warnings from TAWS can be analyzed as to their current status, such as if one warning is currently in place or was recently in place.

Cabin altitude warnings can be analyzed to determine whether a measured cabin altitude exceeds a limit, or has exceeded a limit for a predetermined amount of time. Other aircraft parameters, event data, or warnings can also be taken into account and can be analyzed as to, for example, their severity or recency. For example, the other parameters may include outputs, such as traffic or collision warnings from a traffic alert and collision avoidance system (TCAS) or a similar system.

The distress algorithm can provide various weights to the various inputs and can create the aircraft distress output when a sum of the weighted inputs exceeds a defined threshold. Alternatively, or in addition, the distress algorithm can be implemented using a neural network that may be trained on flight data from previous crashes and previous safe flights.

Although FIG. 1 shows logical AND and OR gates, optionally certain embodiments of the present invention may be implemented in software running on hardware. Thus, the particular physical arrangement of gates is merely an example.

Additionally, among the other aircraft parameters, the distress algorithm can take into account the crash indications. For example, the distress algorithm may take into account whether a frangible link is broken in combination with hydrostatic switches being switched, hydrostatic sensors being triggered, and/or g-switches being activated. For example, if multiple of the crash indications are simultaneously (or nearly simultaneously) identified, the distress algorithm may automatically indicate aircraft distress, even if the other aircraft inputs would otherwise be below a defined threshold or thresholds.

Figure 2:
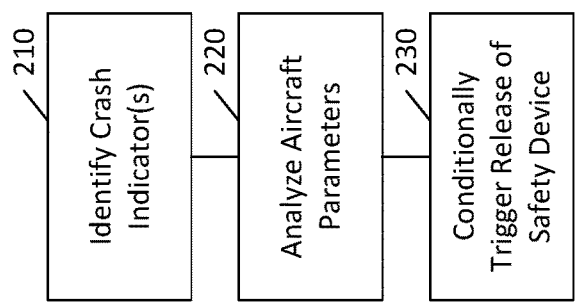
FIG. 2 illustrates an exemplary method, according to certain embodiments of the present invention.

FIG. 2 illustrates an exemplary method, according to certain embodiments of the present invention. As shown in FIG. 2, a method can include, at 210, identifying the presence of at least one crash indicator. The method can also include, at 220, performing an analysis of aircraft distress based on aircraft parameters other than the at least one crash indicator to provide an analysis result of aircraft distress. The method can further include, at 230, triggering the release of a safety device contingent upon the presence of the at least one crash indicator being accompanied by a positive result of aircraft distress.

The safety device can be at least one of an emergency locater transmitter, a crash position indicator or an automatic deployable flight recorder. Any other similar safety device, now or hereafter in use, can be similarly released.

The at least one crash indicator can be a sensor output of a frangible link, a hydrostatic switch, or a g-switch. Other sensor outputs are also permitted.

The aircraft parameters can include a plurality of bank angle, vertical speed, acceleration, ground proximity, terrain warning, cabin altitude warning, traffic warning, collision warning or any other desired aircraft perimeter. Analysis of these parameters can take place, as shown in FIG. 1 and described above.

The release of the safety device may, in certain cases, be permitted only when the presence of the at least one crash indicator is accompanied by a positive result of aircraft distress. Alternatively, the release of the safety device may be permitted even when the presence of the at least one crash indicator is not accompanied by a positive result of aircraft distress, as long as a manual activation switch is activated.

Figure 3:
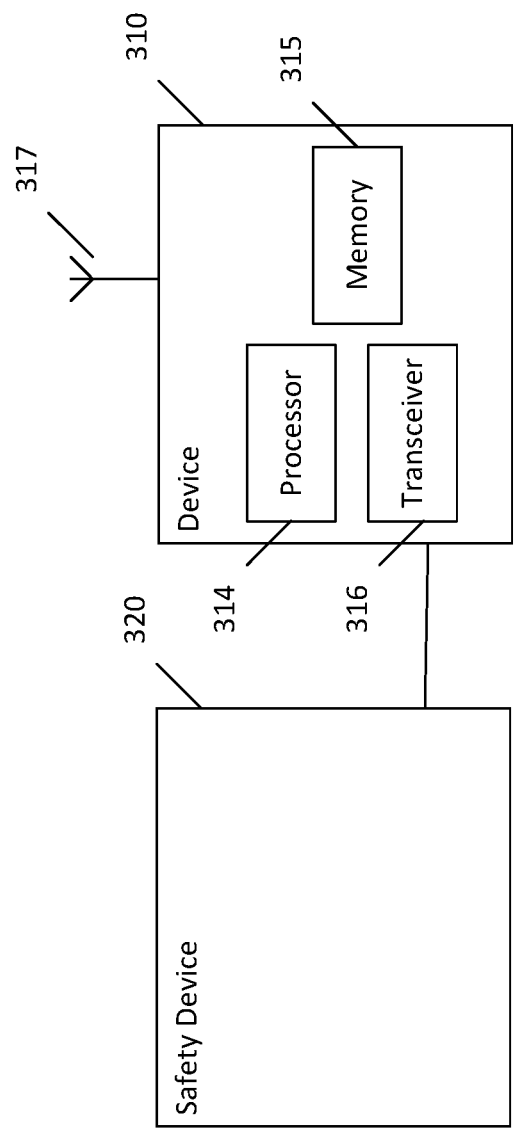
FIG. 3 illustrates an exemplary system, according to certain embodiments of the present invention.

FIG. 3 illustrates an exemplary system, according to certain embodiments of the present invention. It should be understood that each block of the exemplary method of FIG. 2 may be implemented by various means or their combinations, such as hardware, software, firmware, one or more processors and/or circuitry. In one embodiment of the present invention, a system may include several devices, such as, for example, device 310 and safety device 320. The system may include more than one safety device 320 and more than one device 310, although only one of each is shown for the purposes of illustration. The device 310 may be any suitable piece of avionics hardware, such as a line replaceable unit of an avionics system. The safety device 320 may be any desired safety device, such as an emergency locater transmitter, a crash position indicator, or an automatic deployable flight recorder.

The device 310 may include at least one processor or control unit or module, indicated as 314. At least one memory may be provided in the device 310, indicated as 315. The memory 315 may include computer program instructions or computer code contained therein, for example, for carrying out the embodiments of the present invention, as described above. One or more transceivers 316 may be provided, and the device 310 may also include an antenna, illustrated as 317. Although only one antenna is shown, many antennas and multiple antenna elements may be provided for the device 310. Other configurations of the device 310, for example, may be provided. For example, device 310 may be configured for wired communication (as shown to connect to safety device 320), in addition to or instead of wireless communication, and in such a case, antenna 317 may illustrate any form of communication hardware, without being limited to merely an antenna.

Transceiver 316 may be a transmitter, a receiver, or both a transmitter and a receiver, or a unit or a device that may be configured both for transmission and reception.

Processor 314 may be embodied by any computational or data processing device, such as a central processing unit (CPU), a digital signal processor (DSP), an application specific integrated circuit (ASIC), a programmable logic device (PLD), a field programmable gate array (FPGA), a digitally enhanced circuit, or a comparable device or a combination thereof. The processor 314 may be implemented as a single controller, or a plurality of controllers or processors. Additionally, the processor 314 may be implemented as a pool of processors in a local configuration, in a cloud configuration, or in a combination thereof. The term "circuitry" may refer to one or more electric or electronic circuits. The term "processor" may refer to circuitry, such as logic circuitry, that responds to and processes instructions that drive a computer.

For firmware or software, the implementation may include modules or units of at least one chip set (e.g., procedures, functions, and so on). Memory 315 may be any suitable storage device, such as a non-transitory computer-readable medium. A hard disk drive (HDD), random access memory (RAM), flash memory, or other suitable memory may be used. The memory 315 may be combined on a single integrated circuit as the processor, or may be separate therefrom. Furthermore, the computer program instructions which may be stored in the memory 315 and processed by the processor 314 can be any suitable form of computer program code, for example, a compiled or interpreted computer program written in any suitable programming language. The memory 315 or data storage entity is typically internal but may also be external or a combination thereof, such as in the case when additional memory capacity is obtained from a service provider. The memory may be fixed or removable.

The memory 315 and the computer program instructions may be configured, with the processor 314 for the particular device, to cause a hardware apparatus, such as device 310, to perform any of the processes described above (see, for example, FIGS. 1 and 2). Therefore, in certain embodiments of the present invention, a non-transitory computer-readable medium may be encoded with computer instructions or one or more computer programs (such as added or updated software routines, applets or macros) that, when executed in hardware, may perform a process, such as one or more of the processes described herein. Computer programs may be coded by any programming language, which may be a high-level programming language, such as objective-C, C, C++, C#, Java, etc., or a low-level programming language, such as a machine language, or an assembler. Alternatively, certain embodiments of the invention may be performed entirely in hardware.

One having ordinary skill in the art will readily understand that the invention, as discussed above, may be practiced with steps in a different order, and/or with hardware elements in configurations which are different than those which are disclosed. Therefore, although the invention has been described based upon these disclosed embodiments, it would be apparent to those of skill in the art that certain modifications, variations, and alternative constructions would be apparent, while remaining within the spirit and scope of the invention.

We claim:

1. A method, comprising:
    identifying the presence of at least one crash indicator;
    performing an analysis of aircraft distress based on aircraft parameters other than the at least one crash indicator to provide an analysis result of aircraft distress; and
    triggering the release of a safety device contingent upon the presence of the at least one crash indicator being accompanied by a positive result of aircraft distress.

2. The method of claim 1, wherein the safety device comprises at least one of an emergency locater transmitter, a crash position indicator, or an automatic deployable flight recorder.

3. The method of claim 1, wherein the at least one crash indicator comprises a sensor output of a frangible link, a hydrostatic switch, or a g switch.

4. The method of claim 1, wherein the aircraft parameters comprise a plurality of bank angle, vertical speed, acceleration, ground proximity, terrain warning, cabin altitude warning, traffic warning, or collision warning.

5. The method of claim 1, wherein the release of the safety device is permitted only when the presence of the at least one crash indicator is accompanied by a positive result of aircraft distress.

6. The method of claim 1, wherein the release of the safety device is permitted even when the presence of the at least one crash indicator is not accompanied by a positive result of aircraft distress, as long as a manual activation switch is activated.

7. An apparatus, comprising:
    at least one processor; and
    at least one memory including computer program code,
        wherein the at least one memory and the computer program code are configured to, with the at least one processor, cause the apparatus at least to:
    identify the presence of at least one crash indicator;
    perform an analysis of aircraft distress based on aircraft parameters other than the at least one crash indicator to provide an analysis result of aircraft distress; and
    trigger the release of a safety device contingent upon the presence of the at least one crash indicator being accompanied by a positive result of aircraft distress.

8. The apparatus of claim 7, wherein the safety device comprises at least one of an emergency locater transmitter, a crash position indicator, or an automatic deployable flight recorder.

9. The apparatus of claim 7, wherein the at least one crash indicator comprises a sensor output of a frangible link, a hydrostatic switch, or a g switch.

10. The apparatus of claim 7, wherein the aircraft parameters comprise a plurality of bank angle, vertical speed, acceleration, ground proximity, terrain warning, cabin altitude warning, traffic warning, or collision warning.

11. The apparatus of claim 7, wherein the release of the safety device is permitted only when the presence of the at least one crash indicator is accompanied by a positive result of aircraft distress.

12. The apparatus of claim 7, wherein the release of the safety device is permitted even when the presence of the at least one crash indicator is not accompanied by a positive result of aircraft distress, as long as a manual activation switch is activated.

13. A non-transitory computer-readable medium encoded with instructions that, when executed in hardware, perform a process, the process comprising:
   identifying the presence of at least one crash indicator;
   performing an analysis of aircraft distress based on aircraft parameters other than the at least one crash indicator to provide an analysis result of aircraft distress; and
   triggering the release of a safety device contingent upon the presence of the at least one crash indicator being accompanied by a positive result of aircraft distress.

14. The non-transitory computer-readable medium of claim 13, wherein the safety device comprises at least one of an emergency locater transmitter, a crash position indicator, or an automatic deployable flight recorder.

15. The non-transitory computer-readable medium of claim 13, wherein the at least one crash indicator comprises a sensor output of a frangible link, a hydrostatic switch, or a g-switch.

16. The non-transitory computer-readable medium of claim 13, wherein the aircraft parameters comprise a plurality of bank angle, vertical speed, acceleration, ground proximity, terrain warning, cabin altitude warning, traffic warning, or collision warning.

17. The non-transitory computer-readable medium of claim 13, wherein the release of the safety device is permitted only when the presence of the at least one crash indicator is accompanied by a positive result of aircraft distress.

18. The non-transitory computer-readable medium of claim 13, wherein the release of the safety device is permitted even when the presence of the at least one crash indicator is not accompanied by a positive result of aircraft distress, as long as a manual activation switch is activated.

\* \* \* \* \*